United States Patent
Alasingara Bhattachar et al.

(10) Patent No.: US 9,614,847 B2
(45) Date of Patent: Apr. 4, 2017

(54) USER AUTHENTICATION

(71) Applicant: Tata Consultancy Services Limited, Mumbai (IN)

(72) Inventors: Rajan Mindigal Alasingara Bhattachar, Bangalore (IN); Shivraj Vijayshankar Lokamathe, Bangalore (IN); Barkur Suryanarayana Adiga, Bangalore (IN); Balamuralidhar Purushothaman, Bangalore (IN); Sitaram Venkata Chamarty, Madhapur Hyderabad (IN)

( * ) Notice: Subject to any disclaimer, the term of this patent is extended or adjusted under 35 U.S.C. 154(b) by 197 days.

(21) Appl. No.: 14/639,819

(22) Filed: Mar. 5, 2015

(65) Prior Publication Data

US 2015/0256542 A1   Sep. 10, 2015

(30) Foreign Application Priority Data

Mar. 6, 2014   (IN) .......................... 771/MUM/2014

(51) Int. Cl.

| | |
|---|---|
| H04L 29/06 | (2006.01) |
| G06F 21/31 | (2013.01) |
| H04L 9/08 | (2006.01) |
| H04L 9/32 | (2006.01) |
| H04L 9/30 | (2006.01) |

(52) U.S. Cl.
CPC .......... *H04L 63/0884* (2013.01); *G06F 21/31* (2013.01); *H04L 9/0866* (2013.01); *H04L 9/3228* (2013.01); *H04L 9/3297* (2013.01); *H04L 9/3066* (2013.01)

(58) Field of Classification Search
None
See application file for complete search history.

(56) References Cited

U.S. PATENT DOCUMENTS

| | | | |
|---|---|---|---|
| 7,673,141 B2 | 3/2010 | Kilian-Kehr et al. | |
| 2009/0214027 A1* | 8/2009 | Landrock | H04L 9/3066 380/30 |
| 2013/0182848 A1* | 7/2013 | Sundaram | H04L 9/0833 380/277 |
| 2015/0071435 A1* | 3/2015 | Bhattachar | G09C 1/00 380/30 |

FOREIGN PATENT DOCUMENTS

CN   101626291 B   8/2012

* cited by examiner

*Primary Examiner* — Amir Mehrmanesh
(74) *Attorney, Agent, or Firm* — Schwegman Lundberg & Woessner, P.A.

(57) ABSTRACT

Method and system for user authentication are described. The method comprises receiving an authentication code from an application server seeking authentication of the user. Further, a private key of the user is computed in real time based on a user identity (ID) of the user and a master secret key of the PKG. The method further comprises, ascertaining a verification code based on the private key of the user and a verification timestamp, wherein the verification timestamp indicates a time at which the ascertaining of the verification code was initiated. Further, the authentication code is compared with the verification code. Further, the method comprises authenticating the user based on the comparison.

10 Claims, 3 Drawing Sheets

USER AUTHENTICATION

CLAIM OF PRIORITY

This application claims the benefit of priority of India Patent Application No. 771/MUM/2014, filed on Mar. 6, 2014, the benefit of priority of which is claimed hereby, and which is incorated by reference herein in its entirety.

FIELD OF INVENTION

The present subject matter relates to user authentication and, in particular, to authentication of a user using identity based elliptic curve cryptography.

BACKGROUND

Users nowadays avail several services, for example, shopping, ticket reservation, movie ticket reservation, bill payments, and banking over the Internet. The aforementioned services typically involve a transaction between the user and a service provider of a service. For instance, a user may seek to perform a financial transaction by availing the banking services of a bank. In order to facilitate secure transactions between the user and the bank, generally an authentication of the user is performed. The authentication of the user is typically performed using different authentication methods, for example, security questions.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of systems and/or methods in accordance with embodiments of the present subject matter are now described, by way of example only, and with reference to the accompanying figures, in which.

DETAILED DESCRIPTION

Figure 1:
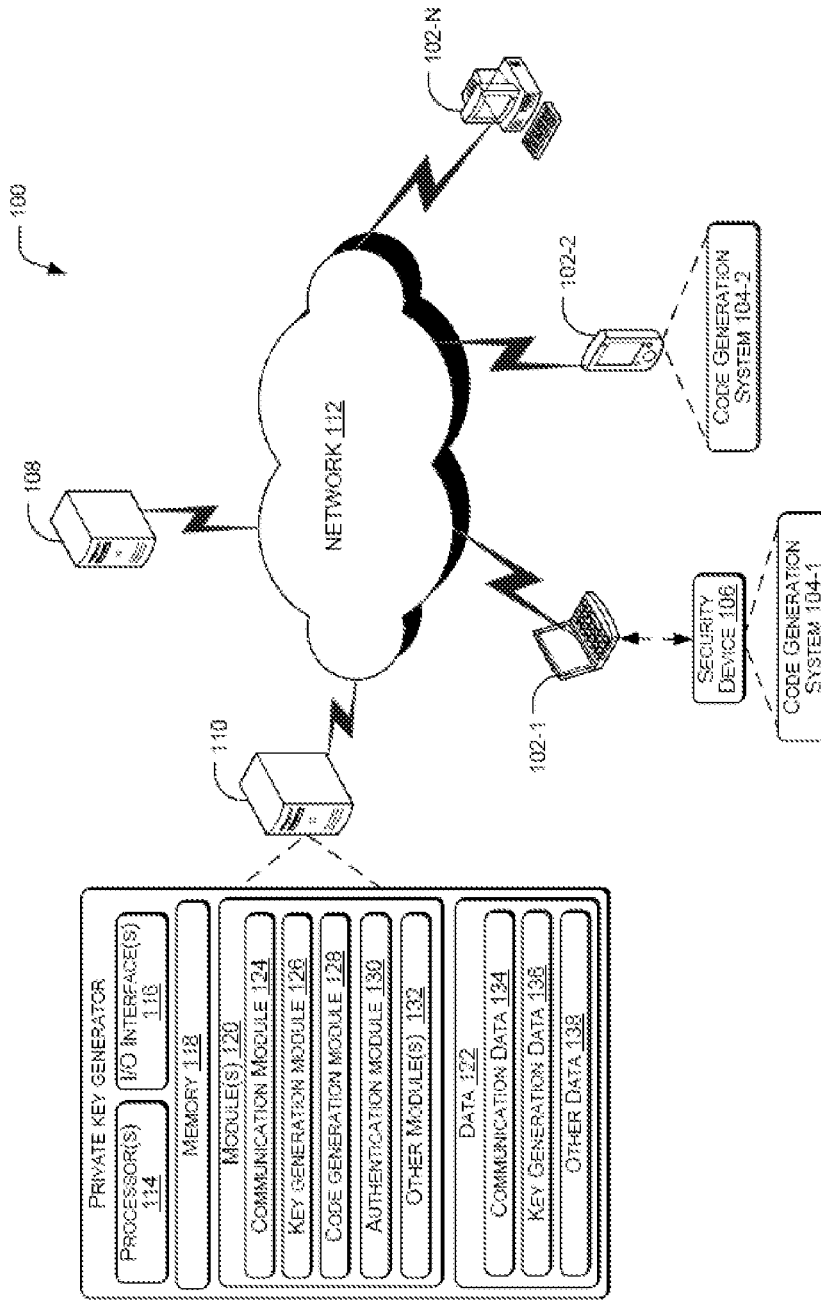
FIG. 1 illustrates a network environment implementing user authentication, according to an embodiment of the present subject matter.

Advancement in information technology has provided users around the world with a convenient platform for availing several services online via the Internet. Typically, for availing an online service, for example, a shopping portal, an online banking service, an online ticket reservation service, a user initially has to register with a service provider of the service. While registering for the service, a user name and a password, typically determined by the user, may be created. The user name and the password are also referred to as user credentials. Further, during the registration, the user may be requested to select a security question and provide a corresponding answer to the question. Upon completion of the registration, a user account corresponding to the user is created with the service provider and the user is registered for availing the service.

Generally, for availing the online services, a financial transaction is performed between the user and a service provider of the service. For instance, the user may purchase a commodity via the shopping portal by making a payment to the service provider running the shopping portal. In order to facilitate secure online transactions between the user and the service provider, an authentication of the user may be performed.

In one approach for authenticating the user, an application server of the service provider may receive the user credentials from the user. Upon receiving the user credentials, the application server may provide the user with several security questions. The user may then select a security question from the several security questions. Thereafter, the user provides an answer to the selected question. The security question selected by the user and the corresponding answer are then compared with the security question and the corresponding answer which were initially provided by the user during the registration process. In case of a successful match, the application server authenticates the user and the online transaction is securely processed. However, the conventional method proves to be a cumbersome process as it requires the user to keep a record of the security question and the answer. Further, the security question and answer pertaining to the user account are generally stored with the application server. In the absence of a secure storage mechanism, the security question and answer may be wrongfully obtained by malicious third parties, for example, a hacker. The obtained security question and answer may then be used by the third party to impersonate the user and perform transactions, thereby resulting in monetary losses to the user.

In another approach, Ron Rivest, Adi Shamir, and Leonard Adleman (RSA) crypto system based architecture may be implemented for authentication of users. In such architecture, user credentials and private key or unique seed corresponding to users registered with the service provider are stored with an authentication server. In said approach, a security device, such as a token, may be provided to a user. The security device generates an authentication code which may be used for authentication of the user. When the authentication server is provided with user credentials and the authentication code for authentication of the user, the authentication server may generate another code, based on the stored private key, for authenticating the user. However, the stored private keys and user credentials may be prone to attacks from malicious third parties. In case of a successful malicious attack, the stored private keys and the user credentials may be exposed and may be used in a manner detrimental to the users. Further, storage of the private keys and the user credentials involve implementation of a well knit infrastructure, such as a public key infrastructure (PM), thereby increasing the implementation cost for facilitating secure transactions between the user and the service provider.

The present subject matter describes systems and methods for user authentication. In accordance with the present subject matter, the public key used for generation of the verification code is not stored with the authentication server. In an embodiment, the private key of the user is generated dynamically by private key generator (PKG) using identity based elliptic curve cryptography. Dynamic generation of the private keys averts the need for storing the private keys with the authentication server. As a result, in case of a malicious attack by a hacker, the security of the users' private keys is maintained. Further, the need for implementation of a separate infrastructure for storage and security of the private keys is averted thereby reducing the implementation cost of the system.

According to an aspect of the present subject matter, a user, upon registering with a service provider of a service may be provided with a security device. The security device may be understood as a computing device configured to generate an authentication code. The authentication code may be understood as a code, comprising a predetermined number of digits, which may be used for authentication of the user while availing the service in future. As may be understood, examples of authentication code may include, but are not limited to, alpha-numeric code, special characters, and upper-case and lower-case alphabets. In one implementation, a private key generator (PKG) may configure the security device for generating the authentication code. In said implementation, a private key of the user and a code generator may be stored in the security device. Based on the private key of the user, an authentication timestamp, and the code generator, the security device generates the authentication code. The authentication timestamp may be understood as a current time at which the generation of the authentication code was initiated. In one example, the authentication code may be generated after every predetermined interval of time.

In one example, an application server of the service provider may seek to authenticate the user in order to render the service to the user. For instance, authentication of the user may be performed prior to booking of the tickets in order to ascertain the authenticity of the user. In said example, the user may be requested to provide user credentials, i.e., a user name and a password, corresponding to the user and the authentication code. The user may then provide the user credentials and the authentication code. Upon receiving the user credentials and the authentication code, the application server may transmit a user identity (ID) and the authentication code to the PKG for performing the authentication of the user. The user ID may be based on publically known information about the user, for example, a date of birth, a phone number, an e-mail id, and a house address of the user.

In one implementation, upon receiving the authentication code and the user ID, the PKG may perform the authentication of the user. In order to authenticate the user, initially the private key of the user may be computed in real time. In one example, the private key of the user may be computed in real time using a public key based on the user ID and a master secret key of the PKG. The private key thus computed may be used for ascertaining a verification code which may be used for authenticating the user.

In one example, the verification code may be ascertained by the PKG based on the private key and a verification timestamp. The verification timestamp may be understood as a current time at which the ascertaining of the verification code was initiated. The verification code ascertained may then be used for authenticating the user.

In one implementation, the verification code may be compared with the authentication code for authenticating the user. In a case where the verification code is equal to the authentication code, the user may be authenticated. In such a case, the authentication process is deemed to be a success and the PKG may indicate the success of the authentication process to the application server. Thereafter, the application server may render the service to the user. In another case, where the verification code is not equal to the authentication code, the user may not be authenticated. In said case, the PKG may indicate failure of the authentication process to the application server and subsequently the user may be denied access to the service.

The system(s) and method(s) of the present subject matter thus avert the need for storing the private key of the user, thereby reducing the security risk associated with storage of private keys. Further, the need for implementing a separate infrastructure for storage and security of the private keys is averted thereby reducing the implementation cost for authenticating the user. Furthermore, use of identity based elliptic curve cryptography in accordance with the present subject matter reduces the computational time required for computation of the authentication code and the verification code thereby reducing the computational time associated with generation of the aforesaid codes.

These and other advantages of the present subject matter would be described in greater detail in conjunction with the following figures. While aspects of described system(s) and method(s) for user authentication can be implemented in any number of different computing systems, environments, and/or configurations, the embodiments are described in the context of the following exemplary system(s).

FIG. 1 illustrates a network environment 100 implementing user authentication, according to an embodiment of the present subject matter. The network environment 100 includes a plurality of user devices 102-1, 102-2, . . . , 102-N, hereinafter collectively referred to as user devices 102 and individually referred to as a user device 102. In one implementation, the user devices 102 may be implemented as one or more computing systems, such as personal computers, laptops, desktops, servers, mobile phones, smart phones, and the like. The network environment 100 further includes code generation system 104-1 and 104-2, hereinafter collectively referred to as code generation system 104 for generating an authentication code which may be used for authenticating a user of the user device 102. In one embodiment, the code generation system 104 may be implemented in the user devices 102-2 as the code generation system 104-2. In another embodiment, the code generation system 104 may be implemented in a security device 106 coupled to the user device 102-1 as the code generation system 104-1. In said embodiment, the code generation system 104-1 may utilize the hardware components and modules (not shown in FIG. 1) of the security device 106 for generating the authentication code.

Further, the network environment 100 includes an application server 108 and a private key generator 110. In one implementation, the application server 108 and the private key generator (PKG) 110 may be implemented as one or more computing systems, such as a desktop computer, a cloud server, a mainframe computer, a workstation, a multiprocessor system, a laptop computer, a network computer, a minicomputer, and a gateway server. The application server 108 and the PKG 110 may be implemented by a service provider of a service for authentication of a user seeking to avail the service.

In one implementation, the user devices 102, the application server 108, and the private key generator 110 may communicate with each other over a network 112. Communication links between the user devices 102, the application server 108, and the private key generator 110 are enabled through a desired form of communication, for example, via dial-up modem connections, cable links, digital subscriber lines (DSL), wireless or satellite links, or any other suitable form of communication. The network 112 may be a wireless network, a wired network, or a combination thereof. The network 112 can also be an individual network or a collection of many such individual networks, interconnected with each other and functioning as a single large network, e.g., the Internet or an intranet. The network 112 can be implemented as one of the different types of networks, such as intranet, local area network (LAN), wide area network (WAN), the internet, and such. Further, the network 112 may include network devices that may interact with the user device 102, the application server 108, and the private key generator 110 through communication links.

In one implementation, the PKG 110 may include one or more processor(s) 114, I/O interfaces 116, and a memory 118 coupled to the processor 114. The processor 114 can be a single processing unit or a number of units, all of which could include multiple computing units. The processor 114 may be implemented as one or more microprocessors, microcomputers, microcontrollers, digital signal processors, central processing units, state machines, logic circuitries, and/or any devices that manipulate signals based on operational instructions. Among other capabilities, the processor 114 is configured to fetch and execute computer-readable instructions and data stored in the memory 118.

The I/O interfaces 116 may include a variety of software and hardware interfaces, for example, interfaces for peripheral device(s), such as a keyboard, a mouse, a display unit, an external memory, and a printer. Further, the I/O interfaces 116 may enable the PKG 110 to communicate with other devices, such as web servers and external databases. The I/O interfaces 116 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interfaces 116 include one or more ports for connecting a number of computing systems with one another or to a network.

The memory 118 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the PKG 110 also includes module(s) 120 and data 122.

The module(s) 120, amongst other things, include routines, programs, objects, components, data structures, etc., which perform particular tasks or implement data types. The module(s) 120 may also be implemented as, signal processor(s), state machine(s), logic circuitries, and/or any other device or component that manipulate signals based on operational instructions.

Further, the module(s) 120 can be implemented in hardware, instructions executed by a processing unit, or by a combination thereof. The processing unit can comprise a computer, a processor, such as the processor 114, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the module(s) 120 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In one implementation, the module(s) 120 further include a communication module 124, a key generation module 126, a code generation module 128, an authentication module 130, and other module(s) 132. The other modules 132 may include programs or coded instructions that supplement applications and functions of the PKG 110.

The data 122 serves, amongst other things, as a repository for storing data processed, received, and generated by one or more of the modules 120. The data 122 includes communication data 134, key generation data 136, and other data 138. The other data 138 includes data generated as a result of the execution of one or more modules in the modules 120.

According to an embodiment of the present subject matter, a user seeking to avail an online service, for example, a movie ticket reservation service, may initially register with a service provider offering the online service. As will be understood, the registration of the user may involve creation of a user account with the service provider. The user account may be accessed by the user using a user name and password, also collectively referred to as user credentials, determined by the user during the registration process. In one embodiment, upon successful registration of the user, the user may be provided with the security device 106. In one implementation, the security device 106 may be pre-configured by the PKG 110 and may include a private key of the user and a code generator stored in an internal memory of the security device. In said implementation, the code generation system 106-1 of the security device 104 may generate an authentication code based on the private key of the user and an authentication timestamp using the code generator. In an example, the timestamp may be indicative of milliseconds elapsed since a predetermined date. For example, the time stamp may be indicative of milliseconds elapsed since 1 Jan. 1971. The authentication code may be understood as a code comprising a predetermined number of digits and may be used for authentication of the user while availing the service in future. The authentication timestamp may be understood as a time at which the generation of the authentication code was initiated. In one implementation, the code generation system 104-1 may generate an authentication code after every predetermined interval of time. For instance, the security device 106 may generate the authentication code after every two minutes. The authentication code generated may then be displayed to the user via a display screen of the security device 106. In another embodiment, the authentication code may be generated by the code generation system 104-2 using the computing resources, such as a processor (not shown in figure) of the user device 102-2. In said embodiment, the authentication code may be displayed to the user via a display of the user device 102-2.

In one implementation, the user may seek to avail the service offered by the service provider through the user device 102-1. In said implementation, the application server 108 of the service provider may seek to authenticate the user prior to rendering the service to the user. For instance, the application server 108 may request the user of the user device 102-1 to provide his user credentials and the authentication code. In response to the request, the user may provide the user credentials and the authentication code to the application server 108 through the user device 102-1. Upon receiving the user credentials, the application server 108 may then transmit a user identity (ID) of the user and the authentication code to the PKG 110 for authentication of the user. The user ID of the user may be based on publically known about the user, for example, a telephone number of the user, date of birth of the user, e-mail address of the user, and first name of the user. In one example, the application server 108 may obtain the user ID of the user from the aforementioned public information using a known conventional hashing technique.

In one implementation, the communication module 124 may receive the authentication code and the user ID from the application server 108. The authentication code and the user ID may then be stored in the communication data 134. As mentioned previously, the authentication code may be used for authenticating the user. For authenticating the user, the PKG 110 may compare the authentication code with a verification code generated by the PKG 110 based on a private key of the user.

In one implementation, the key generation module 126 may compute the private key of the user in real time based on the user ID of the user and a master secret key of the PKG 110. The master secret key of the PKG 110 may be understood as a random integer selected, using known techniques, from a range of one to one less than a prime number. The prime number used may be of a form as mentioned later. For example, for a given prime number p, the master key may be selected from within a range of 1 to p−1. In accordance with the present subject matter, the super-singular elliptic curve may be of a form as represented by the equation 1 provided below:

$$y^2 = x^3 + x \quad (1)$$

Further, the super-singular elliptic curve represented above may be based on a special form of the prime number, such that the prime number satisfies the conditions given by equations 2, 3, and 4 as given below:

$$p = 2^N \pm c \quad (2)$$

$$\log_2 c \leq (\tfrac{1}{2})N \quad (3)$$

$$p \equiv 3 \bmod 4 \quad (4)$$

where N is the length of the friendly prime in bits and c is an integer, also known as a first variable. In one example, the prime number may be of bit length 512 bits. The super-singular elliptic curve and the prime number having the special form as described above reduces the computations required for implementing identity based elliptic curve cryptography for generation of the verification code. Further, in an implementation, the above mentioned form of the prime number and the super-singular elliptic curve may be stored in the security device 106 for facilitating quick computation of the authentication code.

As mentioned above, the key generation module 126 may compute the private key of the user based on the user ID and the master secret key of the PKG 110. In an implementation, the key generation module 126 may initially compute a public key of the user based on the user ID. As will be understood, the public key may be a point on the super-singular elliptic curve, where the super-singular elliptic curve is determined based on the prime number. The key generation module 126 may then compute the private key by scalar multiplication of the public key and the master secret key. For example, the key generation module 126 may use the super-singular elliptic curve of the aforementioned form, a prime number, and a master secret key as given below for computation of the private key:

Prime Number (p):
28544999446937378839776721759247904384222504090930732658868476812955104598477173104369999045954689948627149994858752966231074507772709130763912897762721643

Master Secret Key (Sres):
10948256399571592215005472071269646841570666741760

In above example, the key generation module 126 may compute the private key for the user ID given below by performing scalar multiplication between the public key, which is a point on the elliptic curve, based on the user ID and the master secret key:

User Identity (ID):
356000050264282

Scalar Multiplication:
User's private key (sid)=[Sres][(M)]=
[12445707794001340198198676132409943793313607555746697003132229435736110507648203789764894230842139180038591666862229915836387350446011448419378762804551381439469,1]

where the private key is represented in Jacobian co-ordinate system and M is a point on the elliptic curve based on the user ID. As may be understood, the scalar multiplication may involve point addition and point doubling operation between the public key based on the ID and the master secret key of the PKG 110.

Upon computation of the private key, the code generation module 128 may generate the verification code. The verification code may be understood as a code comprising predetermined number of digits and may be used for authentication of the user. In one implementation, the code generation module 128 may generate the verification code based on the private key of the user and a verification timestamp. The verification timestamp may be understood as a time at which computation of the verification code initiated. For example, using the private key as computed above and a sample verification timestamp as given below, the code generation module 128 may initially obtain an integer value as obtained below:

Sample Verification Timestamp (VTS):
3560000502642829 ms

Integer Value:
Integer value=[VTS][sid]=
507111319839577787622963876529057000930400131732581864752680745275122516217694554

The integer value obtained above may be suitably represented in jacobian co-ordinate system with z co-ordinate equal to one. However, for the sake of brevity, only x co-ordinate value of the integer has been shown above. Further, as may be understood, either the x co-ordinate value of the integer or the y co-ordinate value of the integer may be used to ascertain the verification code.

The code generation module 128 may then ascertain the predetermined number of digits from the integer to obtain the verification code. For example, based on the integer value obtained above, the code generation module 128 may select the first six digits of the integer, i.e., 507111, as the verification code. As will be understood, verification timestamps spread over a predetermined time interval may be used by the code generation module 128 for generating the verification code. For instance, the code generation module 128 may compute verification code based on verification timestamps spread over a timer interval of two minutes from the initial verification timestamp. The generated timestamp may then be used for authentication of the user.

For authenticating the user, in one implementation, the authentication module 130 may compare the verification code with the authentication code. In a case where the authentication module 130 ascertains that the verification code is equal to the authentication code, the authentication module 130 may authenticate the user. In another case, where the authentication code 120 ascertains that the verification code is not equal to the authentication code, the authentication module 130 may not authenticate the user. Thus, the authentication module 130 provides an outcome of the authentication process to the application server 108. The outcome of the authentication process may be one of a success and a failure, where success indicates a successful authentication of the user and failure indicates an authentication failure of the user. Based on the outcome of the authentication process, the application server 108 may or may not render the service to the user.

In another embodiment of the present subject matter, the application server 108 may seek to authenticate the user by using a one time password (OTP). In said embodiment, the application server 108 transmits the user ID of the user of the user device 102 to the PKG 110. Upon receiving the user ID, the code generation module 128 may compute an OTP based on the private key of the user and an OTP timestamp. The private key of the user may be computed by the key generation module 126 in a manner as described above. The OTP timestamp may be understood as a time at which the generation of the OTP initiated. In an implementation, the code generation module 128 may perform a scalar multiplication between the private key of the user and the OTP timestamp to obtain an integer value. Upon obtaining the integer value, the code generation module 128 may select a predetermined number of digits from the integer value. The selected digits may then be provided as the OTP to the user device 102. In an implementation, the communication module 124 may transmit the OTP to the user device 102. In said embodiment, the OTP serves as the authentication code and the user, upon receiving the OTP, provides the OTP to the application server 108. The application server 108 may then transmit the OTP as the authentication code to the PKG 110. Thereafter, the authentication of the user is performed in a manner as explained above.

Figure 2:
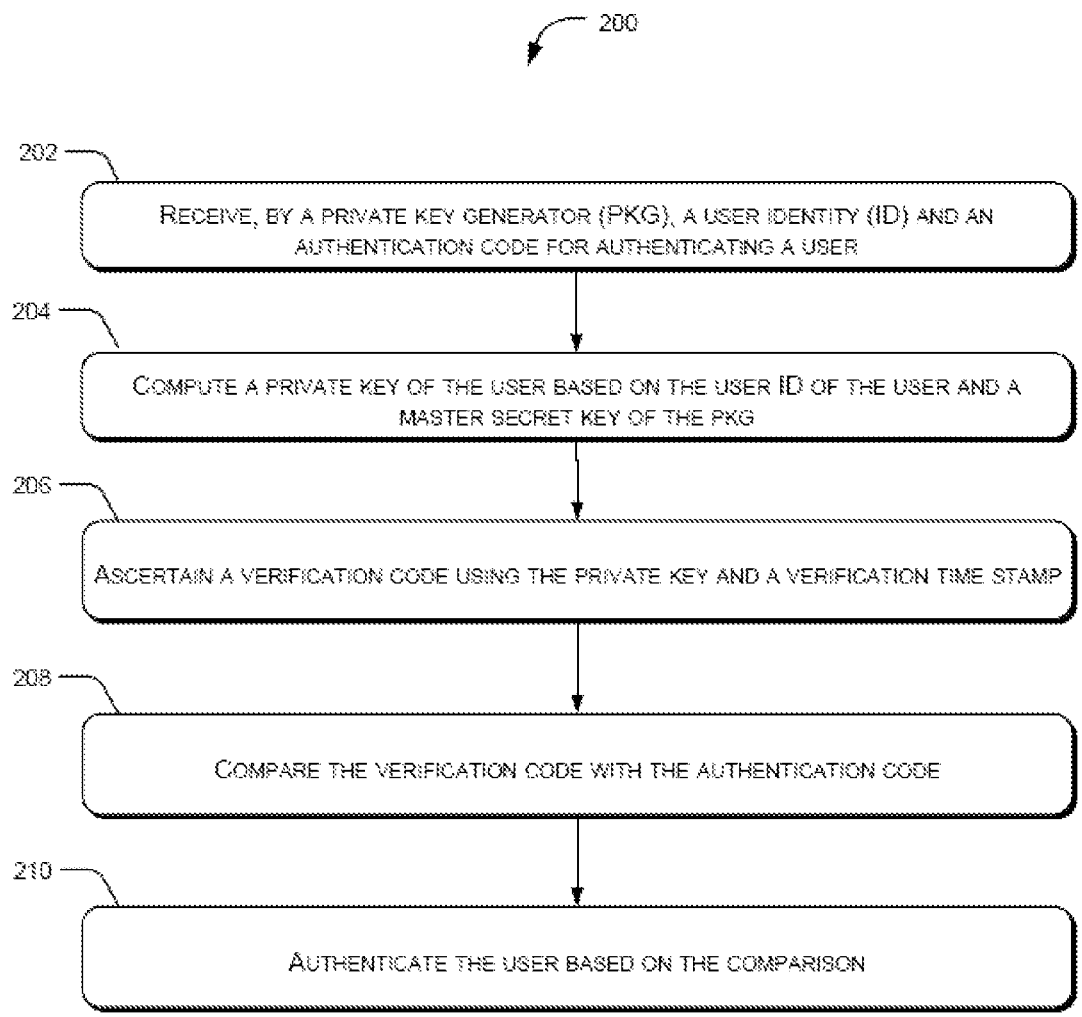
FIG. 2 illustrates a method for user authentication, in accordance with an embodiment of the present subject matter.
Figure 3:
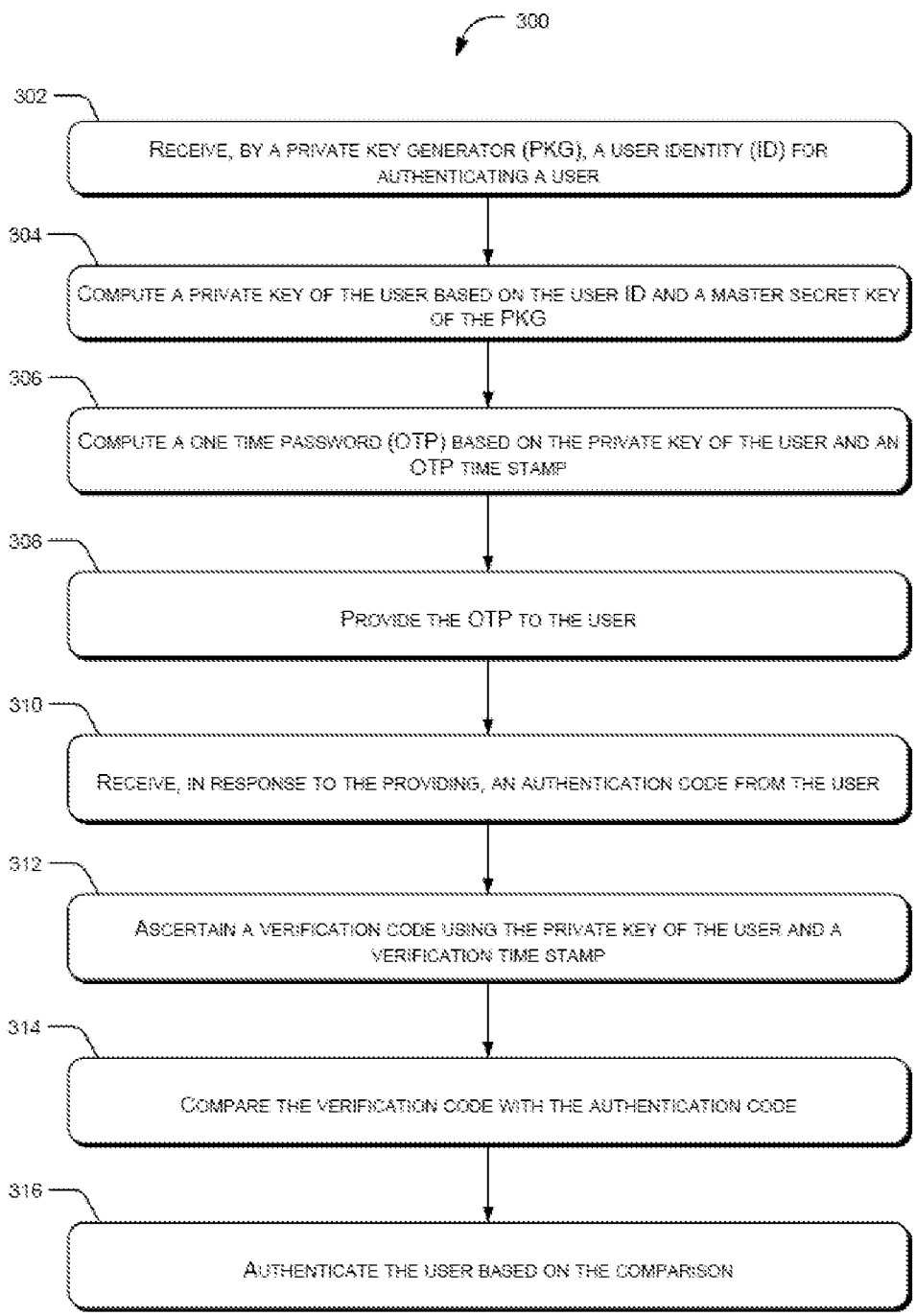
FIG. 3 illustrates a method for user authentication, in accordance with an embodiment of the present subject matter.

FIG. 2 illustrates a method 200 for user authentication, in accordance with an embodiment of the present subject matter. FIG. 3 illustrates a method 300 for user authentication, in accordance with an embodiment of the present subject matter.

The order in which the methods 200 and 300 are described is not intended to be construed as a limitation, and any number of the described method blocks can be combined in any order to implement methods 200 and 300, or an alternative method. Additionally, individual blocks may be deleted from the methods 200 and 300 without departing from the spirit and scope of the subject matter described herein. Furthermore, the methods 200 and 300 may be implemented in any suitable hardware, machine readable instructions, firmware, or combination thereof.

A person skilled in the art will readily recognize that steps of the methods 200 and 300 can be performed by programmed computers. Herein, some examples are also intended to cover program storage devices and non-transitory computer readable medium, for example, digital data storage media, which are machine or computer readable and encode machine-executable or computer-executable instructions, where said instructions perform some or all of the steps of the described methods 200 and 300. The program storage devices may be, for example, digital memories, magnetic storage media, such as a magnetic disks and magnetic tapes, hard drives, or optically readable digital, data storage media.

With reference to FIG. 2, at block 202, user identity (ID) and an authentication code are received by a private key generator (PKG) for authenticating a user. In an example, a user may seek to avail a service, for example, a banking service, and may be requested, by an application server of a service provider rendering the service, to provide user credentials and the authentication code for authentication of the user. The authentication code may be generated by a security device, such as the security device 106. The authentication code may be understood as a code used for authenticating the user. The authentication code may be generated based on a private key of the user and an authentication timestamp. The authentication code and the user credentials may then be provided to the application server. The application server may then transmit the user ID and the authentication code to the PKG. In an implementation, the user ID may be based on a publically known information of the user. For example, the user ID may be based on an e-mail address, a date of birth, a home address, of the user. In an example, the communication module 124 may receive the user ID and the authentication code.

At block 204, a private key of the user is computed based on the user ID and a master secret key of the PKG. Upon receiving the user ID and the authentication code, initially a public key of the user may be computed based on the user ID. As will be understood, the public key is a point on a super-singular elliptic curve, where the super-singular elliptic curve is determined based on a prime number The Thereafter, a scalar multiplication may be performed between the public key of the user and the master secret key of the PKG to obtain the private key. The master secret key of the PKG is a random integer selected from a range of one to one less than the prime number. In an implementation, the key generation module 126 may compute the private key of the user based on the user ID and the master secret key.

At block 206, a verification code is ascertained based on the private key and a verification timestamp. In an example, the verification code may be ascertained by scalar multiplication between the private key of the user and the verification timestamp. The verification timestamp may be understood as a time at which the generation of the verification code was initiated. Upon scalar multiplication between the private key and the verification timestamp, an integer value may be obtained. Thereafter, a predetermined number of digits may be selected from the integer for ascertaining the verification code. In an example, the code generation module 128 may ascertain the verification code.

At block 208, the verification code is compared with the authentication code. The verification code may be compared with the authentication code for ascertaining an outcome of the authentication of the user. In an implementation, the authentication module 130 may compare the verification code with the authentication code.

At block 210, the user may be authenticated based on the comparison. In a case where the verification code is equal to the authentication code, the user may be authenticated. In such a case, the outcome of the authentication is ascertained to be a success, i.e., the user is an authenticated user. In another case where the verification code does not match the authentication code, the user may not be authenticated. In such a case, the outcome of the authentication is ascertained to be a failure, i.e., the user is not an authenticated user. In an implementation, the authentication module 130 may authenticate the user.

With reference to FIG. 3, at block 302, a user identity (ID) is received by a private key generator (PKG) for authenticating a user. The user ID may be based on publically known information about the user, for example, a date of birth of the user, a phone number of the user, and an e-mail address of the user. In an example, the user ID may be obtained from the aforementioned information using known hashing technique In an example, the communication module 124 may receive the user ID from the application server 108.

At block 304, a private key of the user is computed based on the user ID and a master secret key of the PKG. Upon receiving the user ID, initially a public key of the user may be computed based on the user ID. As will be understood, the public key is a point on a super-singular elliptic curve, where the super-singular elliptic curve is determined based on a prime number Thereafter, a scalar multiplication may be performed between the public key of the user and the master secret key of the PKG to obtain the private key. The master secret key of the PKG is a random integer selected from a range of one to one less than the prime number.

At block 306, a one time password (OTP) is computed based on the private key of the user and an OTP timestamp. In an example, a scalar multiplication between the private key of the user and the OTP timestamp may be performed for obtaining an integer. Thereafter, a predetermined number of digits may be selected from the integer for obtaining the OTP. The OTP may be used for authenticating the user.

At block 308, the OTP is provided to the user. In an example, the communication module 124 may provide the OTP to the user.

At block 310, an authentication code is received from the user in response to the providing. Upon receiving the OTP, the user may provide the authentication code through a corresponding user device, such as the user device 102-1. In an example, the communication module 124 may receive the authentication code.

At block 312, a verification code is ascertained based on the private key and a verification timestamp. In an example, the verification code may be ascertained based on an integer value obtained by scalar multiplication between the private key of the user and the verification timestamp. In an example, the code generation module 128 may ascertain the verification code.

At block 314, the verification code is compared with the authentication code. The verification code may be compared with the authentication code for ascertaining an outcome of the authentication of the user. In an implementation, the authentication module 130 may compare the verification code with the authentication code.

At block 316, the user may be authenticated based on the comparison. In a case where the verification code is equal to the authentication code, the user may be successfully authenticated. In another case where the verification code does not match the authentication code, the user may not be authenticated. In an example, the authentication module 130 may authenticate the user.

Although implementations for user authentication have been described in language specific to structural features and/or methods, it is to be understood that the appended claims are not necessarily limited to the specific features or methods described. Rather, the specific features and methods are disclosed as exemplary implementations for user authentication.

We claim:

1. A computer implemented method for authenticating a user, wherein the method comprises:
   receiving, by a private key generator (PKG), an authentication code from an application server seeking authentication of the user;
   computing, by the PKG, a private key of the user in real time based on a user identity (ID) of the user and a master secret key of the PKG;
   ascertaining, by the PKG, a verification code based on the private key of the user and a verification timestamp, wherein the verification timestamp indicates a time at which the ascertaining of the verification code was initiated;
   comparing, by the PKG, the authentication code with the verification code;
   authenticating, by the PKG, the user based on the comparison; and
   wherein the computing comprises:
   obtaining a public key of the user based on the user ID; and
   performing a scalar multiplication between the public key and the master secret key of the PKG, wherein the master secret key is a random integer selected from within a range of one to one less than a prime number (p), wherein the public key of the user is a point on a super-singular elliptic curve, and wherein the super-singular elliptic curve is determined based on the prime number, and wherein the prime number (p) is based on a first variable (c) and Nth power of two, wherein N is an integer, and wherein base two logarithm of the first variable (c) has a minimum value greater than zero and a maximum value equal to half the value of the N given by the equation $\log_2 c \leq (\frac{1}{2})N$, and wherein the prime number (p) is congruent to 3 (mod 4), and wherein bit length of the prime number (p) is of at least 512 bits.

2. The method as claimed in claim 1, wherein the method further comprises receiving the user ID of the user from the application server.

3. The method as claimed in claim 1, wherein the ascertaining comprises performing a scalar multiplication between the private key of the user and the verification timestamp.

4. The method as claimed in claim 1, wherein the method further comprises:
   generating, by the PKG, a one time password (OTP) based on the private key of the user and a OTP timestamp, wherein the OTP timestamp indicates a time at which the generation of the OTP was initiated, and wherein the OTP is the authentication code; and
   transmitting, by the PKG, the OTP to a user device of the user for authentication of the user.

5. A private key generator comprising:
   a computer processor;
   a communication module coupled to the computer processor to receive an authentication code from an application server seeking authentication of a user;
   a key generation module, coupled to the computer processor, to compute a private key of the user in real time based on a user identity (ID) of the user and a master secret key of the private key generator;
   a code generation module, coupled to the computer processor, to ascertain a verification code based on the private key of the user and a verification timestamp, wherein the verification timestamp indicates a time at which the ascertaining of the verification code was initiated; and an authentication module, coupled to the computer processor, to,
compare the authentication code with the verification code; and
the user based on the comparison; and
wherein the key generation module further performs a scalar multiplication between a public key of the user and the master secret key of the private key generator, wherein the public key of the user is obtained based on the user ID and wherein the public key of the user is a point on a super-singular elliptic curve, and wherein the super-singular elliptic curve is determined based on a prime number, and wherein the prime number is based on a first variable (c) and Nth power of two, wherein N is an integer, and wherein base two logarithm of the first variable (c) has a minimum value greater than zero and a maximum value equal to half the value of the N given by the equation $\log 2c \leq (\frac{1}{2})N$, and wherein the prime number (p) is congruent to 3 (mod 4), and wherein bit length of the prime number (p) is of at least 512 bits.

6. The private key generator as claimed in claim 5, wherein the communication module further receives the user ID.

7. The private key generator as claimed in claim 5, wherein the code generation module further performs a scalar multiplication between the private key of the user and the verification timestamp.

8. The private key generator as claimed in claim 5, wherein the code generation module further generates a one time password (OTP) for authentication of the user based on the private key of the user and an OTP timestamp, wherein the OTP timestamp indicates a time at which the generation of the OTP was initiated, and wherein the OTP is the authentication code.

9. The private key generator as claimed in claim 8, wherein the communication module further transmits the OTP to a user device of the user.

10. A non-transitory computer-readable medium having embodied thereon a computer program for user authentication, the method comprising:
receiving an authentication code from an application server seeking authentication of the user;
computing a private key of the user in real time based on a user identity (ID) of the user and a master secret key of a private key generator (PKG);
ascertaining a verification code based on the private key of the user and a verification timestamp, wherein the verification timestamp indicates a time at which the ascertaining of the verification code was initiated;
comparing the authentication code with the verification code;
authenticating the user based on the comparison; and
wherein the computing comprises:
obtaining a public key of the user based on the user ID; and
performing a scalar multiplication between the public key and the master secret key of the PKG, wherein the master secret key is a random integer selected from within a range of one to one less than a prime number (p), wherein the public key of the user is a point on a super-singular elliptic curve, and wherein the super-singular elliptic curve is determined based on the prime number, and wherein the prime number (p) is based on a first variable (c) and Nth power of two, wherein N is an integer, and wherein base two logarithm of the first variable (c) has a minimum value greater than zero and a maximum value equal to half the value of the N given by the equation $\log 2c \leq (\frac{1}{2})N$, and wherein the prime number (p) is congruent to 3 (mod 4), and wherein bit length of the prime number (p) is of at least 512 bits.

* * * * *